United States Patent
Vogan et al.

(10) Patent No.: US 8,001,444 B2
(45) Date of Patent: Aug. 16, 2011

(54) ECC FUNCTIONAL BLOCK PLACEMENT IN A MULTI-CHANNEL MASS STORAGE DEVICE

(75) Inventors: Andrew Vogan, Aloha, OR (US); Jawad B. Khan, Hillsboro, OR (US); Sowmiya Jayachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 11/835,878

(22) Filed: Aug. 8, 2007

(65) Prior Publication Data

US 2009/0044078 A1 Feb. 12, 2009

(51) Int. Cl.
*G11C 29/00* (2006.01)
(52) U.S. Cl. ...................................... 714/773
(58) Field of Classification Search .......... 714/763–765, 714/773, 782, 784; 365/200–201
See application file for complete search history.

(56) References Cited

U.S. PATENT DOCUMENTS

| | | | | |
|---|---|---|---|---|
| 5,357,473 | A | * | 10/1994 | Mizuno et al. ................. 365/201 |
| 5,664,116 | A | * | 9/1997 | Gaytan et al. ................. 709/234 |
| 5,754,567 | A | | 5/1998 | Norman |
| 6,167,551 | A | | 12/2000 | Nguyen et al. |
| 7,055,081 | B2 | | 5/2006 | Boyer et al. |
| 2004/0156251 | A1 | | 8/2004 | Shiota et al. |

OTHER PUBLICATIONS

"PCT International Search Report", dated Feb. 19, 2009 for PCT/US2008/072227, 3pgs.

* cited by examiner

*Primary Examiner* — Shelly A Chase
(74) *Attorney, Agent, or Firm* — Buckley, Maschoff & Talwalkar LLC

(57) ABSTRACT

A multiple channel storage device may include a host controller to receive input data from a host device and a buffer memory to store the input data and associated error correcting data prior to downstream storage. Multiple storage channels downstream from the buffer memory may store the input data and associated error correcting data in at least one of the storage channels on a non-volatile storage media. An error correcting engine between the host controller and the buffer memory may perform error correction encoding on the input data from the host device to generate the associated error correcting data for storage in the buffer memory. Such error correcting engine may protect against data errors in the buffer memory and in the storage channels.

15 Claims, 3 Drawing Sheets

ECC FUNCTIONAL BLOCK PLACEMENT IN A MULTI-CHANNEL MASS STORAGE DEVICE

BACKGROUND

Implementations of the claimed invention generally may relate to the field of multi-channel mass storage devices, and in particular to a error correction in such devices.

Mass storage devices may include a number of memory devices, such as NAND memory devices, NOR memory devices, phase change devices, magnetic media devices, optical storage, etc., that typically include single-channel (i.e., one per memory device) controllers. Such single channel device controllers typically include error correcting code (ECC) encoding and decoding just before the data is being written to the storage device.

ECC encoding typically produces so-called check bytes that are typically stored in a designated location in the memory device. These check bytes may be used to correct data errors resulting from data storage in the device when reading data out of the storage device.

In such a per-channel ECC scheme, the check bytes are typically associated with a sector size (i.e., a specifically-sized division of a storage device) that is native to the memory device. Also, the type or strength of the ECC algorithm used may be limited by a size of the designated location in the memory device for storing the ECC check bytes. These characteristics may not be desirable when designing multi-channel mass storage devices.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
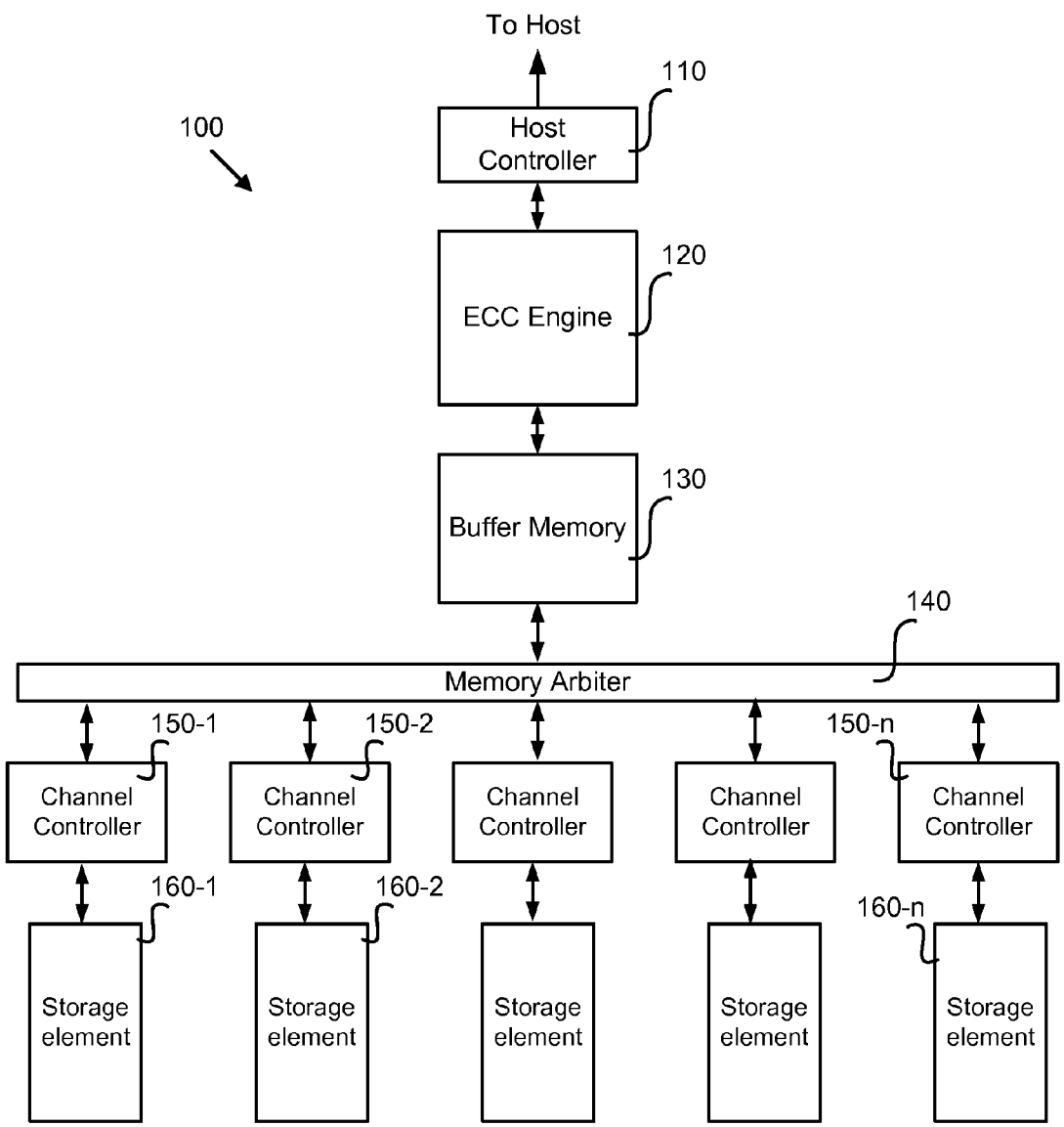
FIG. 1 is a block diagram of a multi-channel mass storage device.

FIG. 1 is a block diagram of a multi-channel mass storage device 100 that may be located within, and may communicate with, a host. Examples of such host may be a computing or media device, such as a notebook computer, handheld device, media player, telecommunication device (e.g., phone), but possible hosts are not limited to this list. Device 100 may include a host controller 110, an ECC engine 120, a memory buffer 130, a memory arbiter 140, and multiple storage channels that each include one channel controller 150-1, 150-2, . . . . 150-n (collectively "controllers 150") and one storage element 160-1, 160-2, . . . , 160-n (collectively "elements 160").

Host controller 110 may be arranged to communicate with the host, for example interpreting host commands, exchanging data with the host, and controlling the behavior of one or more of elements 120-150 (e.g., channel controllers 150). Host controller 110 may include a processor (e.g., CPU) which is used in conjunction with some dedicated logic and/or circuits to perform these function. Host controller is also responsible for controlling ECC engine 120. In some implementations, host controller 110 may also generate and maintain a table that maps a logical address of data to a physical address in devices 160.

ECC engine 120 may be arranged to perform ECC encoding or decoding, depending on which direction (e.g., read or write) the data is being transferred. In some implementations, engine 120 may be implemented via dedicated, purpose-designed logic, but in some implementations, ECC engine 120 may be programmable by controller 110. ECC engine 120 may perform any suitable ECC algorithm, such as Reed-Solomon encoding, BCH (Bose, Ray-Chaudhuri, Hocquenghem) encoding, etc. In some implementations, engine 120 may be configured to perform a stronger or more robust ECC algorithm, for example in applications where data integrity is critical. Such a stronger/more robust ECC algorithm may, in some implementations, generate more or longer check bytes for a given amount of data than a comparatively weaker or less robust ECC algorithm.

Because ECC engine 120 is not associated with a particular data channel or NAND device 160, it may output its check bytes along with the error-corrected data. In this sense, the ECC check bytes may be viewed as a data overhead, and need not be separately treated or stored from the data that they protect. By virtue of its location, the single ECC engine 120 will protect all data in all the storage channels (e.g., channels 1, 2, . . . , n in FIG. 1), and will also protect the data in buffer memory 130. Hence, the data is protected while it is in a controller chip (perhaps including elements 110-140) as well as when it is permanently stored on the storage elements 160, which may be packed separately from a controller chip.

For completeness, ECC engine 120 also may be arranged to decode data using previously-generated check bytes prior to sending it to the host. In this manner, data from buffer 130 may be checked, and any errors introduced by either storage elements 160 or buffer 130 may be corrected by engine 120 prior to providing the data to the host.

Buffer memory 130 may be arranged to store the host data temporarily while read/write operations are in progress. Buffer memory 130 is usually a somewhat large (>256 KBytes, although this number is purely an example, and buffer memory 130 may be larger or smaller) on chip static random access memory (SRAM) and may be subject to random bit inversions which can cause errors. Because the data is protected as soon as it is received from the host (via controller 110), ECC engine 120 provides protection to this data while it resides in buffer memory 130. In this manner, stringent reliability requirements of the enterprise class products may be satisfied by the same ECC engine 120 which protects the data on storage elements 160.

Memory arbiter 140 may be arranged to arbitrate the access to buffer memory 130 among the individual channels. Arbiter 140 may allocate access among controllers 150 according to any suitable arbitration scheme, including round robin, weighted round robin, etc. according to the overall design constraints of storage device 100. For example, if more frequently accessed data is stored in a particular channel or channels, the associated controller 150 may be designated higher priority access relative to other controllers 150.

Channel controllers 150 may control access to and from associated memory devices 160. A particular channel controller 150-n will implement functionality to control the operation of its associated storage element 160-n. Several of these controllers 150 may be attached in parallel to increase the data throughput in device 100. Although five such parallel channels are shown in FIG. 1, in certain implementations, the number of channels employed may be fewer (e.g., from 4 down to 2 channels) or greater (e.g., 6, 8, 10 channels, or more).

Storage elements 160 may be arranged to provide non-volatile storage of data under the respective control of channel controllers 150. Storage elements 160 (and/or corresponding controllers 150) may be of a solid-state technology (e.g., NAND, NOR, phase change, etc.) that is susceptible to data corruption. Elements 160 in some implementations may include magnetic or optical media that may rotate (e.g., hard disk or similar device). Further, elements 160 need not be of a single type. For example, element 160-0 could be solid-state, while element 160-1 could include magnetic media or another type of storage media. For reference, because elements 160 are the most remote components from the host (and associated host controller 110) along a data storage path, they may be referred to as "downstream" from each of components 110-150, whereas these other components are "upstream" from memories 160. By way of another example, ECC engine 120 is upstream from memory buffer 130 and is downstream from controller 110.

Figure 2:
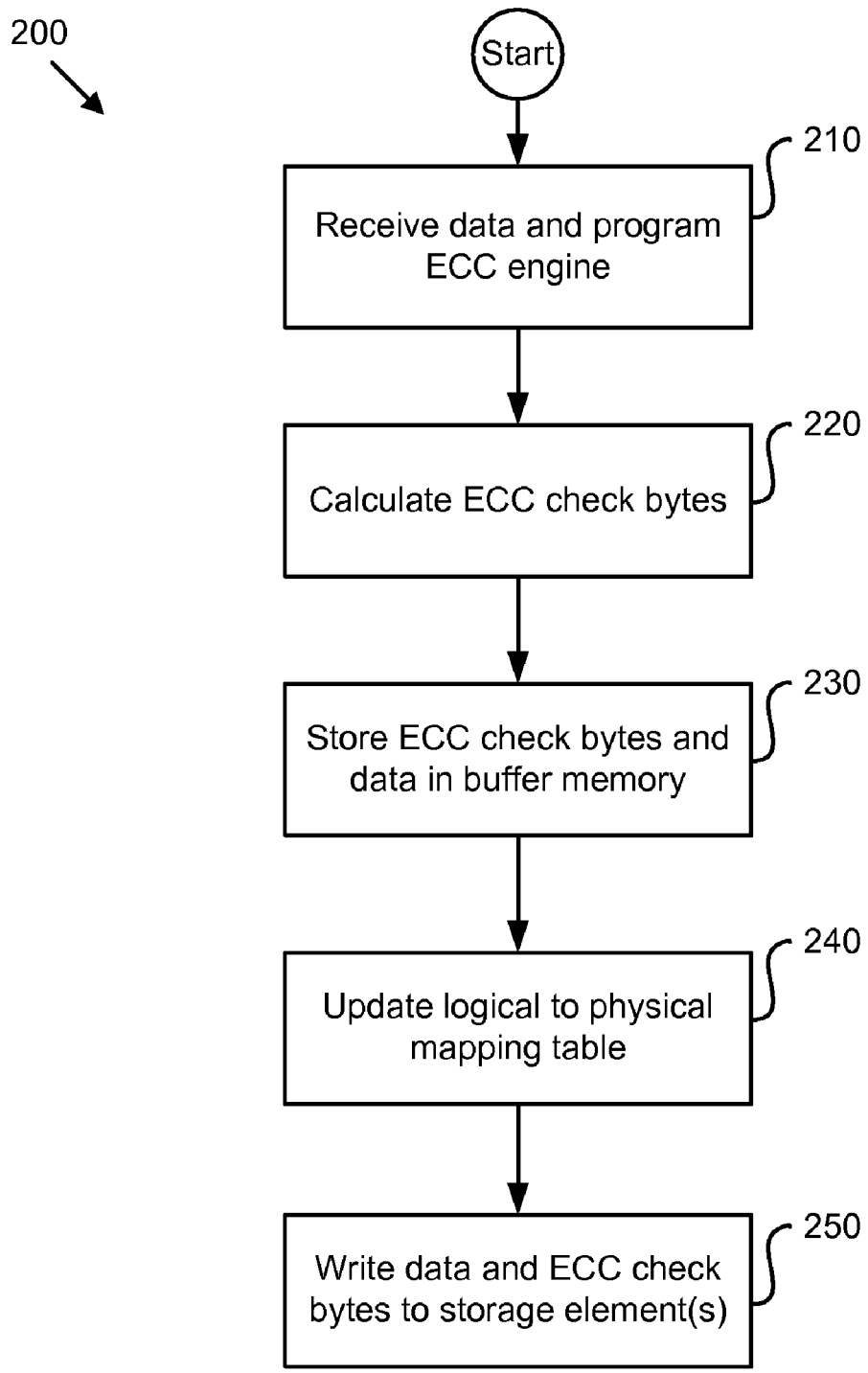
FIG. 2 is a flowchart illustrating a process of writing to the device of FIG. 1.

FIG. 2 is a flowchart illustrating a process 200 of writing data to device 100. The host may send data to be written to the drive. The host controller 110 may receive the data and program the ECC engine 120 to calculate the check bytes to protect the data [act 210]. Such programming be controller 110 may, in some implementations, specify the specific ECC algorithm to be used by engine 120. In other implementations, act 210 may specify other parameters within a particular ECC algorithm, such as a format of the check bytes or other parameter. In some implementations of act 210, a size of the data on which the protection will be applied may be changed by host controller 110.

Once the check bytes are calculated via engine 120 [act 220], they are stored in buffer memory 130 [act 230] waiting to be written to the storage elements 160. Such calculation and storage of check bytes (or more generally check information, as such are not necessarily byte-sized) along with the checked data may effectively disassociate such check bytes from a particular storage element 160. In other words, check bytes may be stored along with their associated data in buffer 130, and may in come implementations ultimately span two or more elements 160.

In conjunction with such storage operation, the host controller 110 may maintain a logical to physical mapping table (e.g., in buffer 130) [act 240]. Such a mapping table will enable controller 110 to locate where each logical page of data (and check information) is located on the physical medium of devices 160.

The host controller 110 may then program the channel controllers 150 to store the data in the storage elements 160 along with the ECC check-bytes [act 250]. The data may span multiple channels 150/160, and the ECC check bytes are written as part of the data onto the main storage of elements 160. Due to the operation of ECC engine 120 in act 220, it is not necessary to put the ECC check-bytes in (or limit such check bytes to) a spare area on the devices 160 that is typically dedicated to check bytes.

Figure 3:
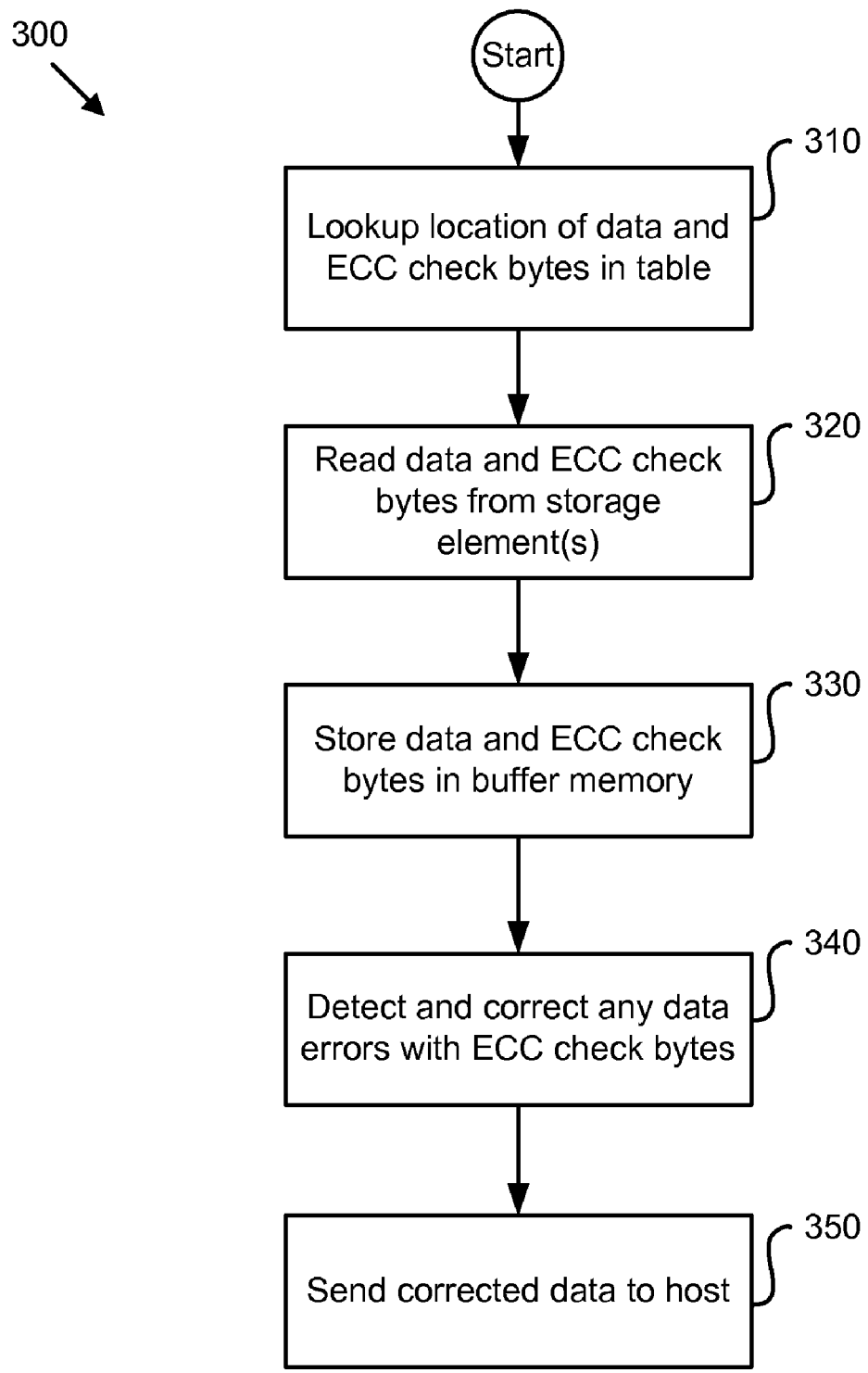
FIG. 3 is a flowchart illustrating a process of reading from the device of FIG. 1.

FIG. 3 is a flowchart illustrating a process 300 of reading from device 100. Process 300 may be used before, after, or contemporaneously with writing process 200 where appropriate. Upon receiving a read request from the host, the host controller 110 will perform a lookup in the logical to physical mapping table [act 310]. Using the physical location of the data in devices 160 obtained from the table, controller 110 may program the channel controller(s) 150 to get the data from the storage elements [act 320]. In so doing, controller 110 may specify, for example, the physical address(es) in elements 160 from which to read the requested data and check bytes. Controllers 150 (possibly in conjunction with arbiter 140) may assemble the requested data in buffer 130 [act 330].

Once the data is assembled in buffer 130, the host controller 110 may program the ECC engine 120 to detect and correct any errors that might have been introduced in the data [act 340]. Engine 120 may use the check bytes to detect any blocks of data that contain erroneous bits and/or bytes. If any such are detected, engine 120 in act 340 may also use the check bytes to correct any errors that may be present, either due to buffer 130 or elements 160. Once the error correction has been performed in act 340, the corrected data may be sent to the host [act 350].

The above-described scheme and/or system may advantageously calculate the ECC check bytes as soon as the data is received from the host, thus dislocating or decoupling the location of the ECC check bytes from the data which is being protected in the physical element(s) 160. This design freedom permits changing the sector size of the drive 100 without being stuck with the default sector size of the storage element 160 being used. Also the strength of the ECC protection may be changed without any limitation by the available spare bytes in the portion of the device 160 that are typically used for ECC check bytes.

Further, because of a single ECC engine 120 for the all storage channels instead of one ECC engine for each channel, a controller chip (e.g., encompassing at least elements 110-130, and possibly elements 140 and/or 150) would be smaller in die area (and thus cheaper). Also, the more stringent reliability requirements typical of an "enterprise class" product may be met by using the same ECC engine 120 for the internal buffer memory 130 as well.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, ECC engine 120 need not be separate from, for example, host controller 110. Other circuitry than that specifically shown may be present in device 100, but ECC engine should be located upstream from both buffer 130 and storage elements 160 to protect against errors in either.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A multiple channel storage device, comprising:
   a host controller to receive input data from a host device;
   a buffer memory to store the input data and associated error correcting data prior to downstream storage;
   multiple storage channels downstream from the buffer memory to store the input data and associated error correcting data in at least one of the storage channels on a non-volatile storage media; and
   an error correcting engine between the host controller and the buffer memory to perform error correction encoding on the input data from the host device to generate the associated error correcting data for storage in the buffer memory.

2. The storage device of claim 1, wherein the error correcting engine is arranged to perform Reed-Solomon encoding or Bose, Ray-Chaudhuri, Hocquenghem (BCH) encoding on the input data.

3. The storage device of claim 1, wherein the error correcting engine is further arranged to perform error correction decoding on output data and associated error correcting data from the buffer memory.

4. The storage device of claim 1, further comprising:
   a memory arbiter between the buffer memory and the multiple storage channels to arbitrate access to the buffer memory among the multiple storage channels.

5. The storage device of claim 1, wherein each of the multiple storage channels includes:
   a solid-state memory device to store the input data and the associated error correcting data; and
   a channel controller to control access to and from the solid-state memory device.

6. The storage device of claim 1, wherein each of the multiple storage channels includes:
   a magnetic memory device to store the input data and the associated error correcting data; and
   a channel controller to control access to and from the magnetic memory device.

7. A multiple channel storage device, comprising:
   a first memory device;
   a first channel controller connected to the first memory device;
   a second memory device;
   a second channel controller connected to the second memory device;
   an arbiter connected to the first channel controller and to the second channel controller;
   a buffer memory connected to the arbiter;
   an error correcting engine directly connected to and upstream of the buffer memory to protect against data errors in the buffer memory, in the first memory device, and in the second memory device; and
   a host controller directly connected to and upstream of the error correcting engine to provide uncorrected input data to the error correcting engine and to receive error corrected output data from the error correcting engine.

8. The storage device of claim 7, wherein the error correcting engine is arranged to perform Reed-Solomon encoding or Bose, Ray-Chaudhuri, Hocquenghem (BCH) encoding and decoding.

9. The storage device of claim 7, wherein the first memory device includes a solid-state memory device, and
   wherein the second memory device includes a solid-state memory device.

10. The storage device of claim 7, wherein the first memory device includes a solid-state memory device, and
    wherein the second memory device includes a magnetic memory device.

11. A method of storing data in a multiple channel storage device, comprising:
    receiving input data by a host controller from a host;
    performing error correction encoding on the input data to generate error correction check information;
    storing the input data and the error correction check information in a buffer memory;
    updating a mapping table with locations for the input data and the error correction check information; and
    writing the input data and the error correction check information to one or more memory devices in accordance with the locations from the mapping table.

12. The method of claim 11, wherein the performing includes:
    performing Reed-Solomon encoding or Bose, Ray-Chaudhuri, Hocquenghem (BCH) encoding.

13. The method of claim 11, wherein the writing includes:
    writing the input data and the error correction check information across two or more memory devices in accordance with the locations from the mapping table.

14. The method of claim 11, further comprising:
    reading output data and associated error correction check information from one or more memory devices in accordance with the locations from the mapping table; and
    storing the output data and associated error correction check information in the buffer memory.

15. The method of claim 14, further comprising:
    performing error correction decoding on the output data using the associated error correction check information to generate corrected output data; and
    sending the corrected output data by the host controller to the host.

* * * * *